(12) United States Patent
Seitz et al.

(10) Patent No.: US 9,780,463 B2
(45) Date of Patent: Oct. 3, 2017

(54) SURGE PROTECTION DEVICE WITH AT LEAST ONE SURGE PROTECTION UNIT

(71) Applicant: DEHN + SÖHNE GMBH + CO. KG, Neumarkt (DE)

(72) Inventors: Thomas Seitz, Seubersdorf (DE); Peter Zahlmann, Neumarkt (DE)

(73) Assignee: DEHN + SÖHNE GmbH + Co. KG, Neumarkt (DE)

( * ) Notice: Subject to any disclaimer, the term of this patent is extended or adjusted under 35 U.S.C. 154(b) by 0 days.

(21) Appl. No.: 15/125,695

(22) PCT Filed: Feb. 10, 2015

(86) PCT No.: PCT/EP2015/052717
§ 371 (c)(1),
(2) Date: Sep. 13, 2016

(87) PCT Pub. No.: WO2015/135709
PCT Pub. Date: Sep. 17, 2015

(65) Prior Publication Data
US 2017/0005418 A1    Jan. 5, 2017

(30) Foreign Application Priority Data

Mar. 13, 2014  (DE) .................. 10 2014 003 693
May 19, 2014   (DE) .................. 10 2014 007 352

(51) Int. Cl.
*H01R 4/24*    (2006.01)
*H01R 4/26*    (2006.01)
(Continued)

(52) U.S. Cl.
CPC .......... *H01R 4/2404* (2013.01); *H01H 83/10* (2013.01); *H01R 4/2429* (2013.01);
(Continued)

(58) Field of Classification Search
CPC .. H01R 4/2404; H01R 9/2625; H01R 4/2416; H01R 4/245; H01R 4/2462; H01R 12/616
(Continued)

(56) References Cited

U.S. PATENT DOCUMENTS 4,422,709 A  * 12/1983  Croci ................... H01R 12/772
                                                       439/492
5,086,368 A    2/1992  Gerke et al. .................. 361/118
(Continued)

FOREIGN PATENT DOCUMENTS

DE   39 17 270 A1   11/1990   ............. H01R 13/66
DE   39 17 270 C2   10/1997   ............. H01R 13/66
(Continued)

OTHER PUBLICATIONS

The Notification Concerning Transmittal of International Preliminary Report on Patentability (Chapter I of the Patent Cooperation Treaty), in English, dated Sep. 22, 2016, the English translation of the International Preliminary Report on Patentability (Chapter I of the Patent Cooperation Treaty), dated Sep. 13, 2016, the Written Opinion of the International Searching Authority, in English (Sep. 13, 2016—mailed with the English translation of the International Preliminary Report on Patentability), and the International Search Report, in English, dated May 22, 2015, which were issued by the International Bureau of WIPO in Applicant's corresponding international PCT application having Serial No. PCT/EP2015/052717, filed on Feb. 10, 2015.

(Continued)

*Primary Examiner* — Hae Moon Hyeon
(74) *Attorney, Agent, or Firm* — Bodner & O'Rourke, LLP; Gerald T. Bodner; Christian P. Bodner

(57) ABSTRACT

A surge protection device comprises at least one surge protection unit, consisting of a substantially U-shaped socket part and a plug part which can be fixed in the socket
(Continued)

part and which receives a surge protector. Insulated electric conductors on or in the socket part are contacted by vampire taps or displacing terminals. The surge protection device also comprises openings or perforations formed in the socket part for receiving conductors. The openings are selectively designed so that the electric conductors are inserted into or through the openings, and the openings are exposed in a socket part region which can be covered by the socket part such that cutting surfaces located on the base of the plug part penetrate the conductor insulation during the plug-in process and directly contact the respective conductor.

2 Claims, 8 Drawing Sheets

(51) Int. Cl.
*H01R 11/20* (2006.01)
*H01R 9/24* (2006.01)
*H01R 9/26* (2006.01)
*H01H 83/10* (2006.01)
*H04M 1/00* (2006.01)
*H04M 1/74* (2006.01)

(52) U.S. Cl.
CPC ......... *H01R 9/2416* (2013.01); *H01R 9/2625* (2013.01); *H01R 9/2641* (2013.01); *H04M 1/00* (2013.01); *H04M 1/745* (2013.01)

(58) Field of Classification Search
USPC .................. 439/426, 427, 404, 425; 361/118
See application file for complete search history.

(56) References Cited

U.S. PATENT DOCUMENTS

| | | | |
|---|---|---|---|
| 5,224,881 A | 7/1993 | Lejuste et al. | 439/709 |
| 5,515,436 A | 5/1996 | Bonvallat | 379/412 |
| 5,802,170 A | 9/1998 | Smith et al. | 379/412 |
| 7,201,601 B2* | 4/2007 | Lappohn | H01R 4/2433 |
| | | | 439/404 |
| 7,806,716 B2* | 10/2010 | Zahlmann | H01T 4/06 |
| | | | 439/354 |
| 8,628,361 B2* | 1/2014 | Kato | H01R 12/585 |
| | | | 439/751 |
| 8,670,221 B2* | 3/2014 | Gillespie | H01R 9/2433 |
| | | | 361/118 |
| 8,908,346 B2* | 12/2014 | Birkholz | H01T 4/06 |
| | | | 361/118 |
| 9,380,721 B2 | 6/2016 | Hopf | |
| 9,478,895 B2* | 10/2016 | Lappoehn | H01R 13/6272 |
| 2008/0200061 A1* | 8/2008 | Lee | F21V 21/002 |
| | | | 439/427 |
| 2014/0009858 A1* | 1/2014 | Suchy | H01T 1/12 |
| | | | 361/91.1 |

FOREIGN PATENT DOCUMENTS

| | | | | |
|---|---|---|---|---|
| EP | 0 399 628 | 11/1990 | ............. | H01R 13/66 |
| EP | 0 498 151 | 8/1992 | ............. | H01R 9/24 |
| EP | 0 637 853 | 2/1995 | ............. | H01R 4/24 |
| EP | 0 667 650 A2 | 8/1995 | ............. | H01R 4/24 |
| EP | 0 667 650 B1 | 9/1998 | ............. | H01R 4/24 |
| EP | 2 280 466 | 2/2011 | ............. | H01R 12/67 |
| WO | WO 92/15127 | 9/1992 | ............. | H01R 13/703 |
| WO | WO 2013/164330 | 11/2013 | ............. | H01R 13/52 |

OTHER PUBLICATIONS

"*Produktdatenblatt: DEHNgap*", Sep. 27, 2013 (Sep. 27, 2013), XP055188733. Publication Available at: http://www.dehn.de/pdbRes/DE_DE_Web/477/31222/Artikelnummer-pdf/31232/961102.pdf (last accessed on Dec. 22, 2016) (no copy enclosed).

"*LSA-PLUS Series 2 Connection and Disconnection Modules and Accessories*", Aug. 31, 2011 (Aug. 31, 2011), p. 3, XP055189059. Publication Available at: http://docs-Europe.electrocomponents.com/webdocs/1306/0900766b81306138.pdf (last accessed on Dec. 22, 2016) (no copy enclosed).

"*Earthing system —Wikipedia, the free encyclopedia*", Mar. 8, 2014 (Mar. 8, 2014), XP055189068. Publication Available at: http://en.wikipedia.org/w/index.php?title=Earthing_system &oldid=598736606 (last accessed on Dec. 22, 2016) (no copy enclosed).

* cited by examiner

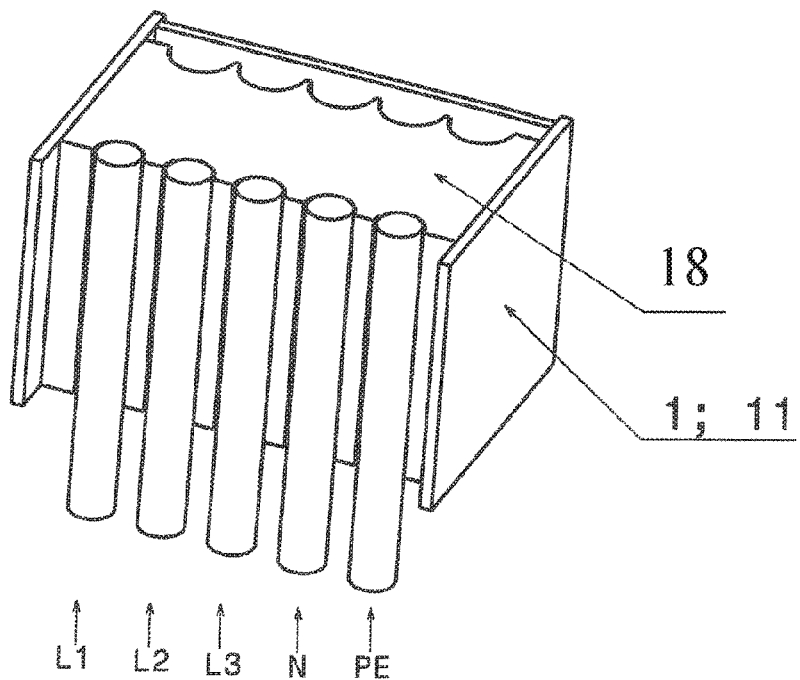
Fig. 6   L1 L2 L3 N PE
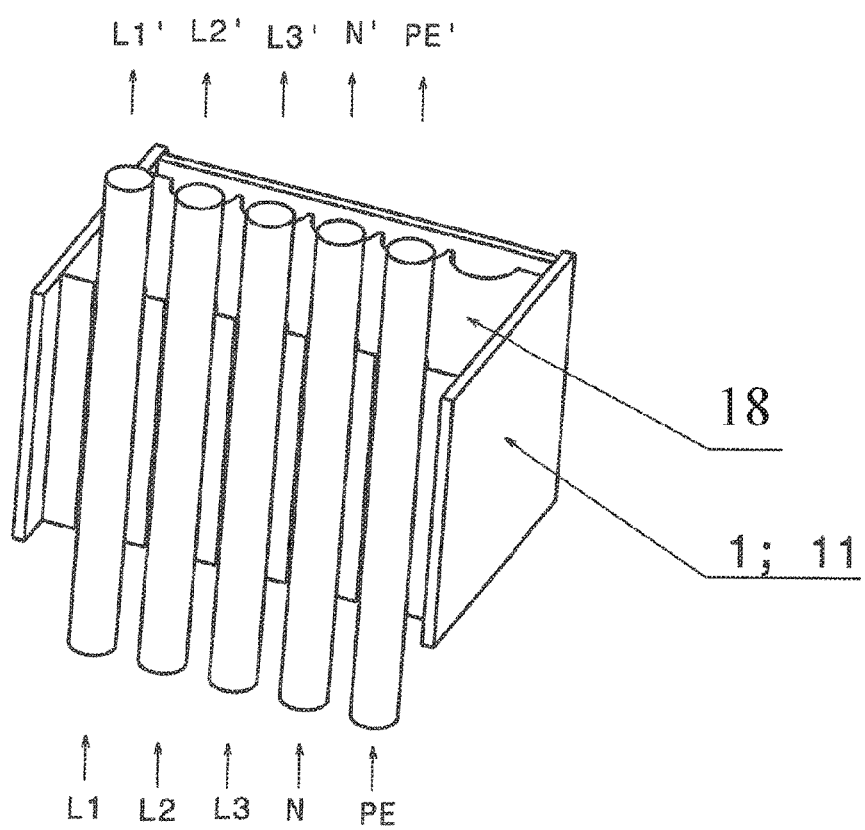
Fig. 7   L1 L2 L3 N PE

SURGE PROTECTION DEVICE WITH AT LEAST ONE SURGE PROTECTION UNIT

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

Not applicable

BACKGROUND OF THE INVENTION (1) Field of the Invention

The invention relates to a surge protection device comprising at least one surge protection unit, consisting of a substantially U-shaped socket part and a plug part which can be fixed in the socket part and which receives a surge protection means, wherein insulated electric conductors on or in the socket part are contacted by means of vampire taps or insulation displacement terminals and openings or perforations for receiving conductors are formed in the socket part, according to the preamble of claim 1.

(2) Description of Related Art

Surge protection devices, consisting of a socket or base part, which is suitable for example for DIN rail mounting and which receives the actual surge protection units in the form of plug parts, have been prior art for many years. Reference is made here to the current surge protection units of DEHN+SÖHNE GmbH+Co. KG, Neumarkt/Oberpfalz.

Such surge protection units are, as already mentioned, used taking recourse to DIN rails in local supply networks and mounted and electrically contacted in junction boxes to this effect. The respective conductor can be contacted using caged screw terminals. To this effect, the conductors must be processed, stripped and mechanically clamped individually.

So-called comb busbars allow a faster connection in the screw terminal technology. Additional accessories are necessary for v-shaped wiring. However, the existing wiring in several individual operations is time-consuming and there is a risk that wiring errors may occur in the individual wiring, thus requiring rework.

In the field of telecommunications network construction, so-called fast connection technology is widely used. Here, cable cores can be connected without soldering, screwing or removing insulation using a multifunctional insertion tool. Details about the quick IDC technology can be found in the product brochure of ADC Krone GmbH, Inside LSA-PLUS.

Furthermore, a terminal block with surge protection is already known from DE 39 17 270 C2. The terminal block comprises two rows of insulation displacement contacts for connecting insulated cable cores, specifically cables for telecommunication and data technology. Furthermore, a surge arrester that can be connected to the terminal block is available. The rows of insulation displacement contacts are arranged on different sides of the terminal block. An insulation displacement contact of the first row is connected via a connecting element with an insulation displacement contact of the second row. The surge arrester is arranged laterally midway between the two rows of insulation displacement contacts. With such a solution, a terminal block can be created, which permits wiring and removal of connected cable cores and inspection and testing of connected cable cores even with surge protection.

A development of the above-described prior art can be found in EP 0 667 650 B1, which also shows a connection system for communication and data systems wherein reference is also made to the insulation displacement connection technology.

Furthermore, WO 2013/164330 A1 discloses a cable clip device for so-called module electronics. The device assumes a multipart housing and an electronic circuit which is located in the housing and which exhibits connecting devices for connecting the electrical circuit to a power current of insulated lines leading from a solar module. At least one component of the electrical circuit is connected in parallel to the solar module. Furthermore, parts of the housing around the passing lines with their insulation can be assembled. The connection devices comprise perforation elements that perforate the insulators when assembling the parts of the housing and make electrical contact with the lines. The insulation displacement technology with the designed perforation elements is realized such that it can be directly activated by the joining of parts of the housing without use of special tools being needed. The perforation elements perforate the insulation of the wires when assembling the aforementioned housing and ensure electrical contact with sufficient ampacity by making a sufficient incision into the wire cross-section.

BRIEF SUMMARY OF THE INVENTION

From the abovementioned, it is an object of the invention to specify a developed surge protection device with at least one surge protection unit, consisting of a socket part and a plug part that can be fixed into the socket part, which comprises surge protection means, which is universally applicable for all network systems, namely TT/TNS or TNC systems and for which the socket part can be established without isolation displacement technology. The wiring-in should be realisable in a safe and secure way, even with v-shaped wiring. Another object of the device to be created is to ensure a safe contact even with conductors with different cross-sections, so that the operational reliability and the long-term reliability are increased on a whole.

The means of attaining the object of the invention occurs by combining the features of the coordinate claim 1 or 2, wherein the dependent claims constitute at least useful embodiments and developments.

Therefore, a surge protection device with at least one surge protection unit is assumed. The surge protection unit comprises a substantially U-shaped socket part and a plug part which can be fixed in the socket part and also a number of individual plug parts where applicable. The one or more plug parts comprise surge protection means. This can mean varistors, spark gaps or the like.

On or in the base part, insulated electric conductors are contacted using vampire taps or insulation displacement terminals. Furthermore, openings or perforations are formed in the socket part for receiving conductors.

In reference to the U-shaped base part, it is to be noted that this only has to be suitable to fasten a plug part interchangeably but surge-current-proof and to ensure its accessibility.

According to the invention, the openings located in the socket part are designed for either inserting or pushing through the electrical conductors. The openings are exposed in an area of the socket part, which can later be covered by the plug part.

According to a first embodiment of the invention, the exposed conductor sections are contacted by the cutting faces found on the base of the plug part, and namely through the fact that the conductor insulation is perforated by the cutting faces.

The above means that the cutting faces move through the conductor insulation when inserting the plug part and contact the metallic conductor core. The necessary force effect for secure contacting, which is surge current proof, is preserved through a known catch of the plug part or parts in the socket part.

In a second embodiment of the invention, a locking plate or several latching webs are insertable into the socket part. The locking plate or latching webs may be part of the socket part, i.e. delivered and pre-assembled with this. In the starting position, the locking plate or the latching webs are in a position such that it is possible to insert the corresponding conductors through the openings in the socket part or push them through in the case of v-shaped wiring.

The locking plate and/or latching webs comprise contact faces pointing to the plug part and cutting faces directed to the conductors, and in a way such that the cutting faces perforate the conductor insulation during pressing or latching and contact the corresponding conductors, so that an electrical connection is created between the corresponding contact faces and the corresponding conductors.

The actual plug part is then plugged into the pre-construction of the socket part with locking plate and the existing contacted conductors there and makes an electrical connection with the contact faces of the plug part via the contact counterfaces located on its base.

In one embodiment of the invention, the plug part has conductive sections at its base, which correspond in position and direction with the contact faces of the locking plate or latching webs. These conductive sections were labelled above as contact counterfaces.

In the socket part, a receiving cavity for a conductor plate is provided, which is usually made of insulating material, e.g. a plastic material.

The conductor plate comprises a formation of groove-like recesses corresponding to the number of conductors. The cross-section of the groove-like recesses may correspond for example to a circular segment, be U-shaped or V-shaped, or designed similarly.

The aforementioned conductor plate supports the relevant electrical conductor during the insulation displacement contacting procedure, which contributes considerably to the reliability of the desired electrical connection.

In a preferred embodiment, the conductor plate can be formed as an insert component, wherein the groove-like recesses have a shape adapted to the conductor cross-sectional shape.

In turn here, as the preferred embodiment, the conductor plate is removable from the receiving cavity or can be used in a reversed or rotated manner, wherein a first surface side of the conductor plate comprises grooves for conductors with a first cross-section and a second surface side comprises grooves for conductors with a second cross-section.

The groove shape and the cross-sections of the conductors may vary in this version.

It is additionally conceivable for the conductor plate to be designed as a block with a square cross-sectional surface, wherein each of the surface sides possesses specific grooves for the relevant conductor diameters in order to create an even greater multifunctionality.

The invention will be described in greater detail below by means of embodiment examples and with the use of figures.

In the drawings:

BRIEF DESCRIPTION OF THE SEVERAL VIEWS OF THE DRAWINGS(S)

Figure 3:
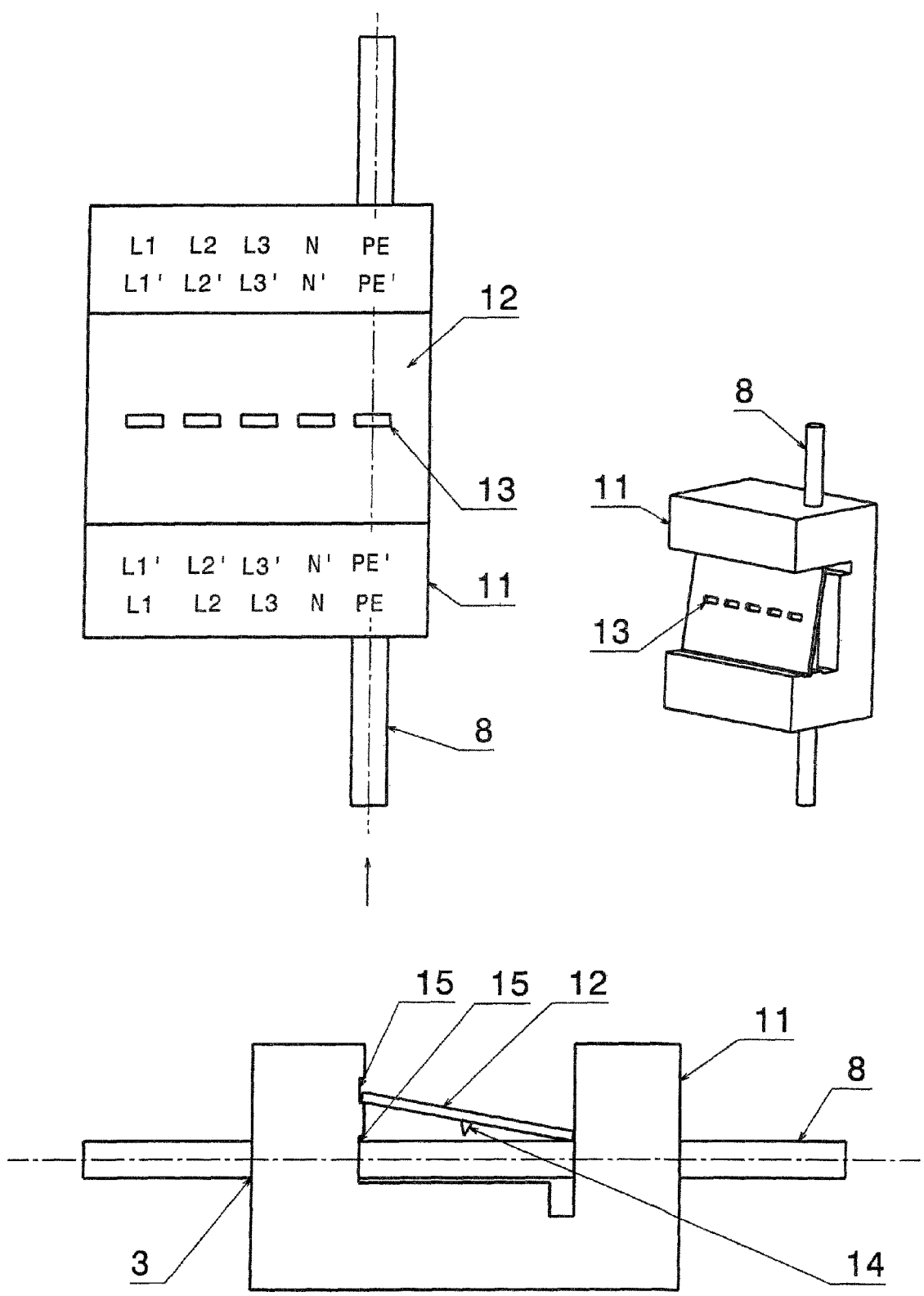

FIG. 3 refers to the second embodiment of the invention comprising a socket part having a locking plate, which contains the contact faces pointing towards the plug part and cutting faces directed towards the conductors.

Figure 4:
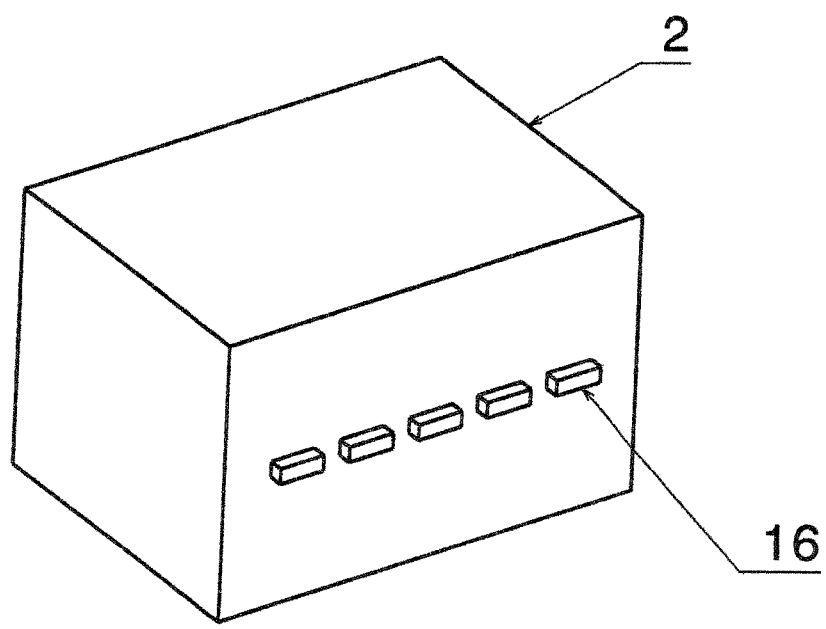

FIG. 4 shows a basic plug part, suitable for use when using the lower section as per FIG. 3.

Figure 5:
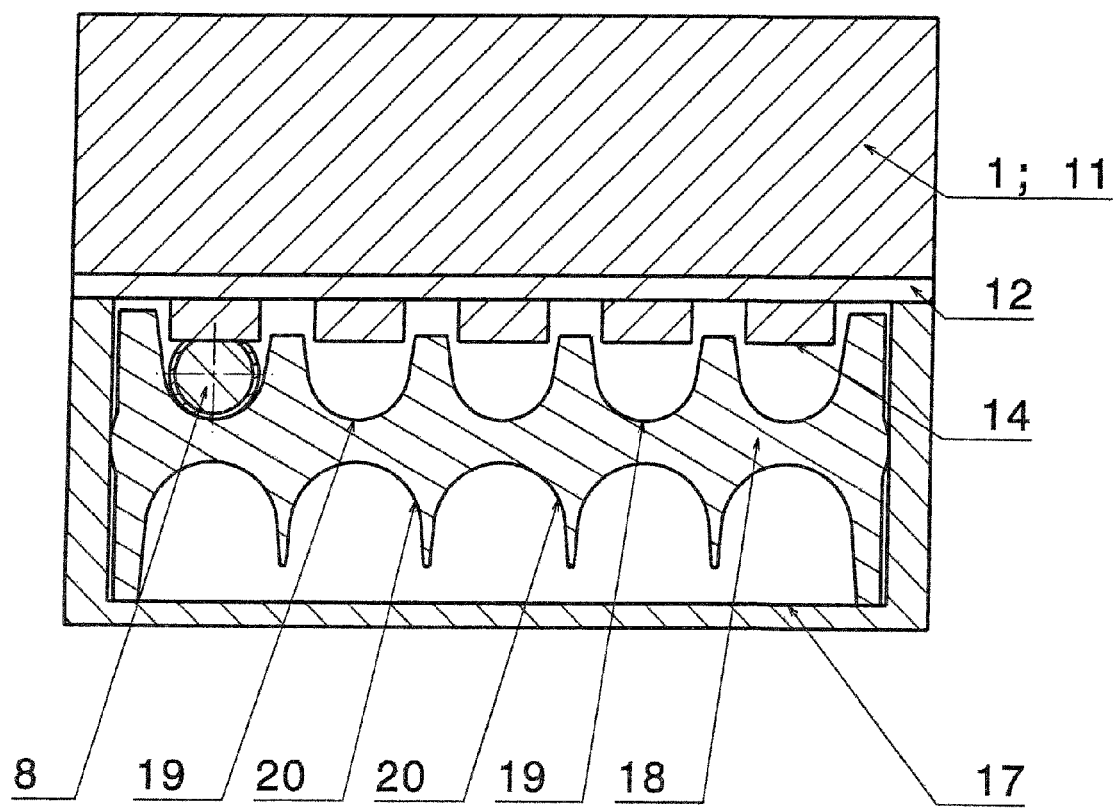

FIG. 5 shows a cross-section through the plug part as per the invention with a conductor plate, which has groove-shaped recesses of different diameters in order to guarantee a connection of strand cross-sections of different dimensions.

With the help of FIGS. 6 and 7, the socket part with included conductor plate is shown as a perspective view, which can be used turned into the receiving cavity of the socket part relating to the accommodation of conductors of different cross-sections.

Figure 8:
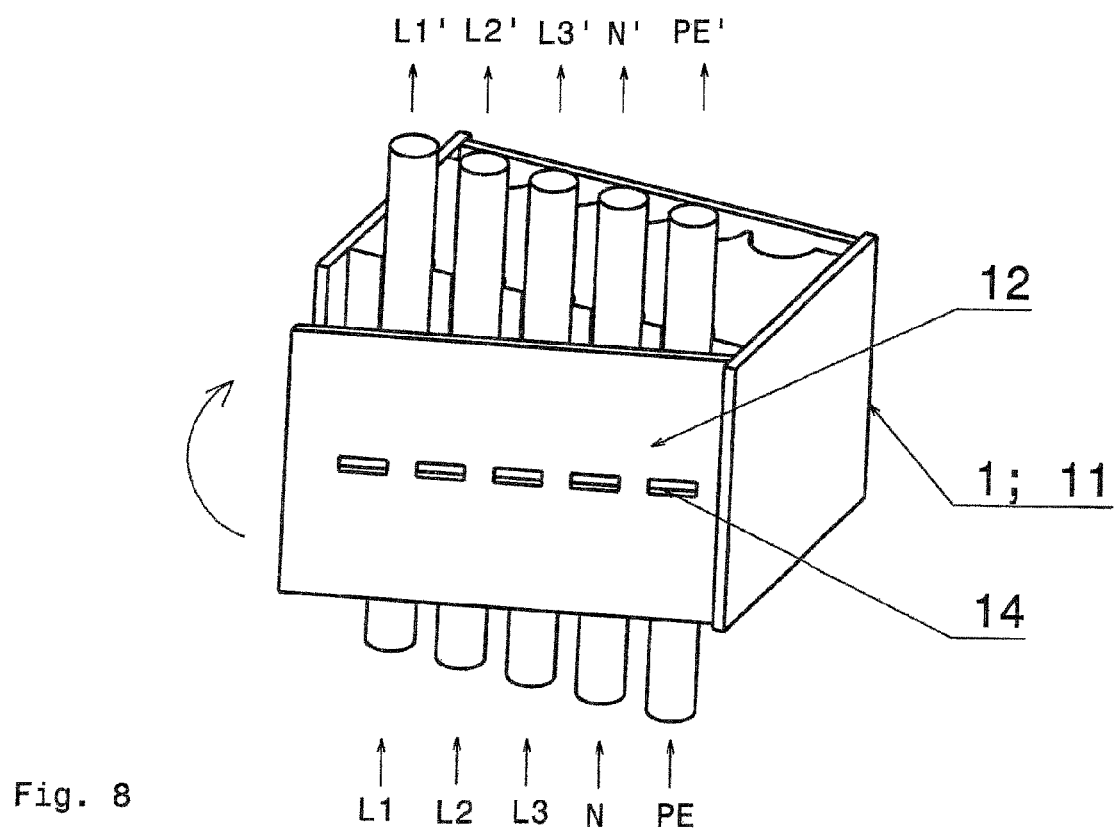

In a continuation of FIG. 6 and FIG. 7, FIG. 8 shows the locking plate with the cutting faces turned downwards in the image for contacting the corresponding conductors on the basis of vampire-insulation technology.

Figure 9:
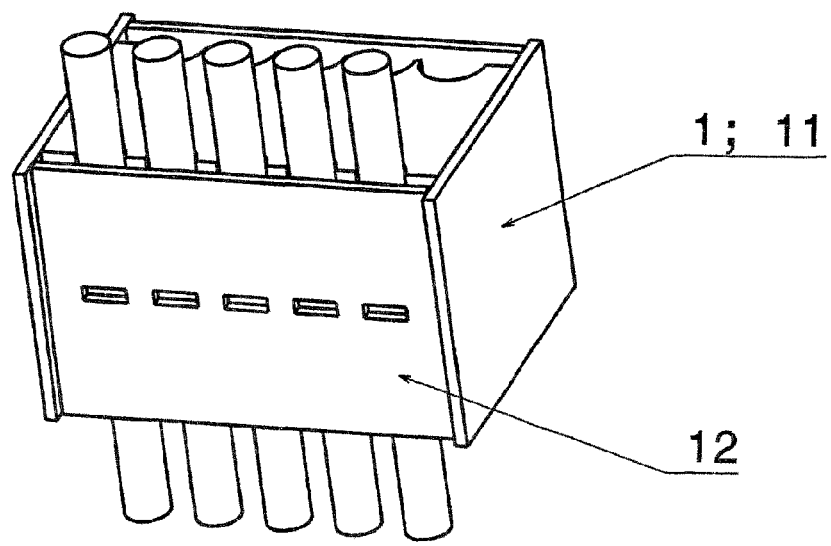

FIG. 9 is based on the presentation according to FIG. 8. According to the movement executed by the arrow illustration in FIG. 8, the plate locks with the insulation displacement terminals engaged in a corresponding recess in the side wall of the socket part and creates the secure contacting of the otherwise non-stripped conductors.

Figure 10:
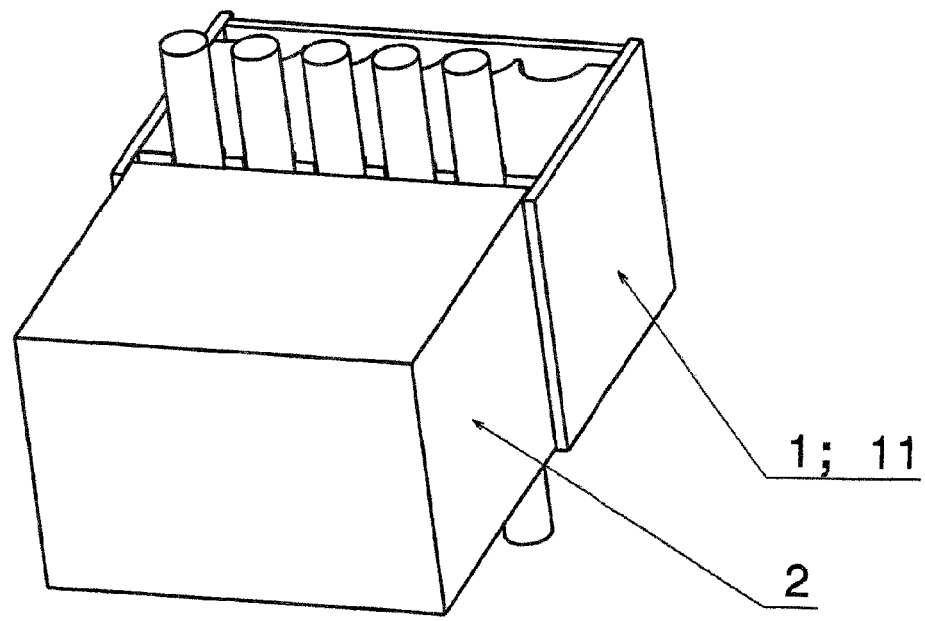

FIG. 10 illustrates the entire unit comprising socket part with strand plate and contacted conductors and plug part.

DETAILED DESCRIPTION OF THE INVENTION

Figure 1:
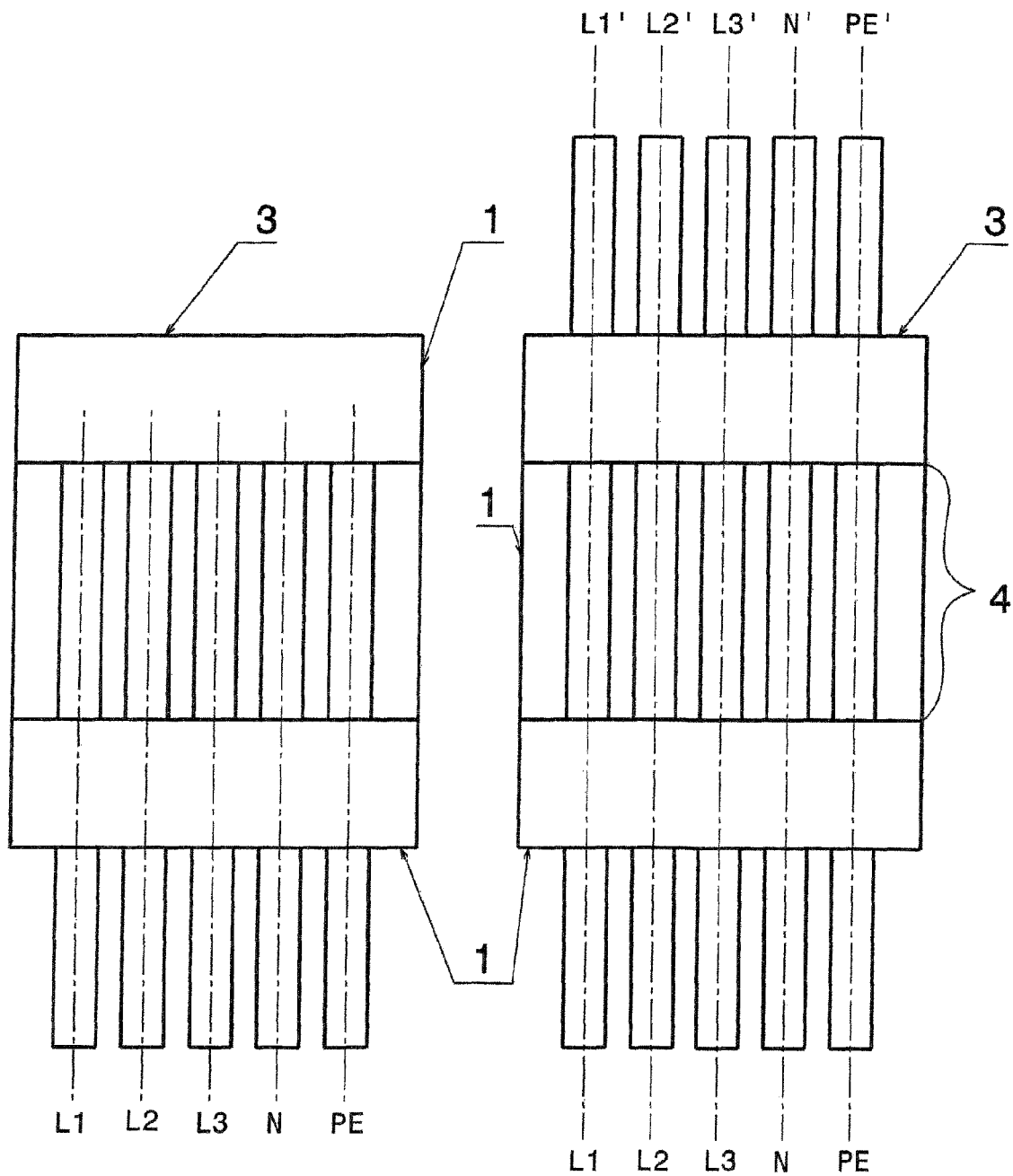
FIG. 1 shows two aerial views of the front part as per a first embodiment of the invention, once with looped-through wiring (right figure) and the other with a perforation sealed at a front opening for the conductor. In case of v-shaped wiring, the conductors are pushed through opposing perforations; with tap connections (left illustration) they are only inserted.
Figure 2:
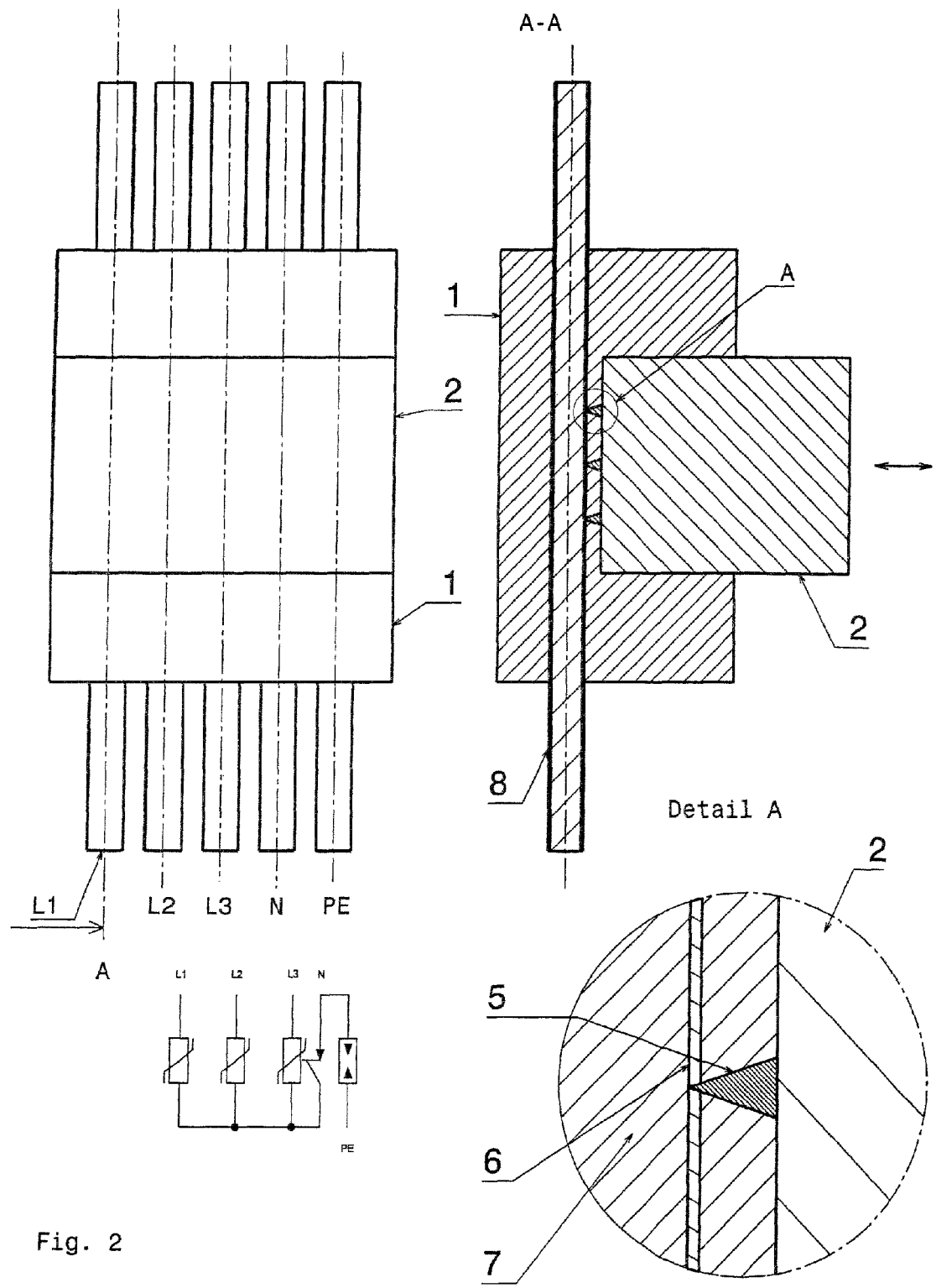
FIG. 2 shows an aerial view and a longitudinal section of the surge protection device as per the invention with detailed representation A along the line A-A, from which the principle of vampire-cutting technology or vampire-clamp technology can be seen.

According to the schematic diagrams of FIGS. 1 and 2, a socket part 1 is assumed as per the first embodiment of the invention, which, as becomes clear in the cross-sectional representation as per FIG. 2, top right, has a U-shaped configuration.

In the socket part 1 a plug part 2 can be inserted in a locking, but interchangeable manner.

The plug part 2 comprises surge protection means. These means can comprise, for example, spark gaps, varistors or similar.

Electrical conductors L1, L2, L3, N, PE are contacted in socket part 1. In this regard, face-side openings or perforations 3 exist, which are used to push in or push through the electrical conductors L1, L2, L3, N and/or PE.

The diagrams as per FIG. 1 show that the conductors L1, L2, L3, N and PE are exposed in a section 4 of the socket part 1. This section 4 is later covered by plug part 2.

Cutting faces 5 located at the base of plug part 2 are able to perforate the conductor insulation 6 when plugging in the plug part 2 and to contact the metallic core 7 of the conductor 8 in question.

With a tap connection, the aforementioned openings or perforations 3 can be sealed or remain sealed on a side of plug part 2.

With the V-connection, both openings on the opposite sides are free and thus designed as perforation.

Using the corresponding contacting and design of the cutting faces 5 at the respective plug part 2 in conjunction with a selector switch, the corresponding network systems TT/TNS or TNC can be selected, which is indicated in the diagrams as per FIG. 2.

In the second embodiment of the invention, a universal socket part 11 is assumed, which in turn receives conductors 8 via the relevant openings 3.

The socket part 11 receives a locking plate 12 with vampire-cutting or insulation displacement technology for locking into the socket part in this embodiment.

In this regard, the locking plate 12 comprises contact faces 13 on its top side, i.e. on the surface facing the plug part not displayed in FIG. 3.

Directed to the conductors 8, the locking plate 12 comprises cutting faces 14, which perforate the conductor insulation when pushing or pressing in the locking plate 12 and contact the conductor core.

In this regard, latching recesses 15 are present in one of the U-legs of the socket part 11 with a pre-assembled locking plate 12.

With subsequent use of the plug part 2 specified for the second embodiment (see FIG. 4), contact counterfaces 16 formed there contact the contact faces 13.

FIG. 5 ff. also show that a receiving cavity 17 is provided for a conductor plate 18 in socket part 1 and 11.

The conductor plate 18 comprises a formation of groove-like recesses 19 and 20 corresponding to the number of conductors 8.

The conductor plate 18 is formed as an insert and can be removed from the receiving cavity 17 and reused in a reversed form. With the help of various forms of the groove-like recesses 19 and 20 on the various sides, conductors with various cross-sections, e.g. 10/16 mm$^2$ or 25/35 mm$^2$, can be received.

The possible embodiments of the wiring by tap connection or V-connection are shown in FIGS. 6 and 7, wherein the possibility of turning the strand plate is also documented.

The process of vampire IDC contacting is documented on the basis of FIG. 8, which symbolically shows contact plate 12, which comprises the relevant vampire insulation displacement terminals 14 on the side facing conductors L1, L2, L3, N and PE and comprises windows, which form the contact faces 13 on the reverse of the relevant insulation displacement terminals.

The arrow representation symbolizes the swivel, locking and connected insulation displacement contacting movement.

FIG. 9 shows the status as per the latched plate 12, wherein the desired electrical contacting of the conductor is now present.

In a known manner, the actual plug part 2, formed as a protective module, can be latched with the socket part 1; 11 as per the diagram of FIG. 10.

The invention claimed is:

1. A surge protection device comprising at least one surge protection unit, consisting of a substantially U-shaped socket part (1) and a plug part (2) which can be fixed in the socket part (1) and which receives a surge protection means, wherein insulated electric conductors (8) on or in the socket part (1) are contacted by means of vampire taps or insulation displacement terminals and openings or perforations (3) for receiving conductors are formed in the socket part (1), characterized in that
   the openings (3) are designed optionally to insert or push through the insulated electric conductors (8) and in a section (4) of the socket part (1), which can be covered by the plug part (2), are exposed wherein the socket part (1) comprises or receives a locking plate (12) or a number of latching webs, which comprise contact faces (13) pointing to the plug part (2) and cutting faces (14) directed to the insulated electric conductors (8), such that the cutting faces (14) perforate a conductor insulation (6) during pressing or latching and contact the corresponding insulated electric conductors (8), so that an electrical connection is created between the corresponding contact faces (13) and the corresponding insulated electric conductors (8).

2. The surge protection device according to claim 1, characterized in that
   the plug part (2) has conductive sections (16) at its base, which correspond in position and direction with the contact faces (13) of the locking plate (12) or latching webs.

* * * * *